July 5, 1966 — I. F. WEBB — 3,259,353
ROPE HOOK
Filed Nov. 5, 1964
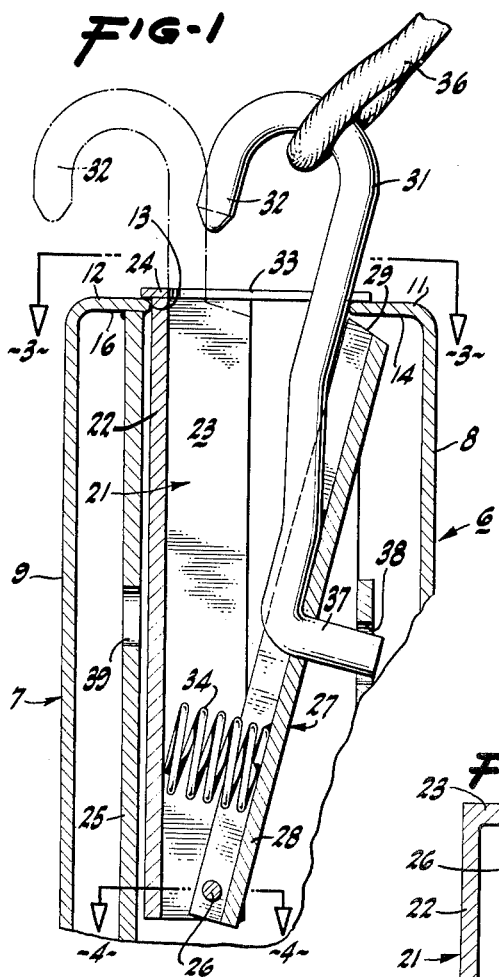
INVENTOR.
IVAN F. WEBB
BY
Lothrop & West
ATTORNEYS

United States Patent Office 3,259,353
Patented July 5, 1966

3,259,353
ROPE HOOK
Ivan F. Webb, 630 E. Main St., Vacaville, Calif.
Filed Nov. 5, 1964, Ser. No. 409,125
5 Claims. (Cl. 248—361)

My invention relates primarily to a device for use especially in connection with truck bodies, particularly pickup bodies, having stake openings therein and is for the purpose of providing a convenient rope attaching means for holding lading in place on the pickup body.

Many vehicle bodies are provided in ordinary production with one or more generally rectangular stake openings in the upper surface of the double walled sides of the body. The stake openings are normally utilized to receive and retain upright stakes along either side of the body to confine lading which rises above the ordinary height of the body sides. The bodies so provided are usually otherwise relatively smooth and without protuberances. It is often desirable to install relatively high lading on the pickup body and to tie the lading in position with ropes or the like instead of utilizing the detachable stakes. There is now no convenient way for doing this.

It is therefore an object of my invention to provide a rope hook which can be utilized in connection with a pickup body in place of the stake normally used and which is effective as an anchor or fastening point for a securing rope.

Another object of the invention is to provide a rope hook which can be temporarily installed in the stake opening of a pickup body and which after use as a rope anchoring point can readily be removed so that the alternatively utilized stake can be replaced.

Another object of the invention is to provide a rope hook for temporary use in a stake opening in a body which is firm and secure when in use but can easily and simply be detached when not needed.

Another object of the invention is to provide a rope hook which is quite simple and economical in its construction so that one or more can feasibly be supplied for use with pickup bodies.

Another object of the invention is to provide a rope hook which can easily be engaged with any of the pickup stake bodies presently available.

A still further object of the invention is to provide a rope hook which seats firmly in position, does not rattle and is effective for its intended purpose.

Other objects together with the foregoing are attained in the embodiment of the invention described in the accompanying description and illustrated in the accompanying drawing, in which:

FIGURE 1 is a cross section on a vertical median plane through a rope hook installed in a pickup body having a stake opening therein;

FIGURE 2 is a side elevation of the device of FIGURE 1;

FIGURE 3 is a cross section, the plane of which is indicated by the line 3—3 of FIGURE 1;

FIGURE 4 is a cross section, the plane of which is indicated by the line 4—4 of FIGURE 1; and FIGURE 5 is a fragmentary view similar to FIGURE 1 but showing a modified spring arrangement.

In the usual environment, the rope hook of the invention is designed to be used in connection with a pickup body 6 having a hollow, enclosing side 7 made up of an interior sheet metal panel wall 8 and an exterior sheet metal panel wall 9. These panels are generally vertical and have at their upper ends inturned portions 11 and 12 constituting a substantially flat horizontal top wall. At appropriate locations in the top wall stake openings 13 are cut and are defined flanges 14 and 16 constituted by the inturned portions 11 and 12 of the walls 8 and 9. Each stake opening 13 is generally rectangular or substantially rectangular in configuration and is located approximately midway between the side walls 8 and 9. Customarily, a rectangular stake of wood is introduced through the opening 13 and is lodged between the side walls and extends to a substantial distance above the top wall formed by the members 11 and 12.

For use in connection with lading against the inside wall 8, I provide a rope hook. This includes a frame 21 conveniently fabricated of a metal shape such as a channel either performed or bent to have a substantially U-shaped cross section, thus affording a central web 22 and side flanges 23. The configuration of the frame 21 is such that it can easily be passed through the opening 13 and has a length to extend downwardly between the walls 8 and 9. In some bodies the frame 21 extends into close abutment with both of the walls 8 and 9, but in other bodies the close abutment is with a reinforcing plate 25.

At its upper end the frame 21 has a top plate 24 overlying the flanges 14 and 16 and adapted to rest on the top of the side 7. The plate 24 acts as an abutment or stop for the frame 21 in an inward or downward direction with respect to the body 6.

Adjacent its lower end, the frame 21 carries a pivot pin 26 extending between the flanges 23 and serving as a mounting for a latch member 27. The latch member 27 swings about the pivot pin 26. The latch member 27 comprises a latch lever portion 28 terminating in a latch end 29 extending transversely of the latch member and continues in a hook portion 31 passing through the opening 13 and bent to provide a terminal hook 32. In one pivotal position of the latch member, the latch lever end 29 lies under the flange 11, whereas in another position of the latch member the lever end 29 is in line with the opening 13 so that the latch member can then pass through the opening if desired. The plate 24 is provided with a notch 33 to accommodate the motion of the latch member.

In order to urge the latch member into a latch position as shown in FIGURE 1, a spring 34 is interposed between the web 22 and the lower, central portion of the latch lever 28. In many cases, a helical spring 34 is conveniently used, but in other instances a leaf spring 35 (FIGURE 5) is employed.

Especially for use with bodies which may not have a flange 14 or for additional holding power with bodies having flanges 14, it is preferred to extend the hook portion 31 at its lower end to provide a projection 37 which is received in an aperture 38 through a wall of the body when the latch end 29 is in its FIGURE 1 position. When the latch member 27 is moved to release position, the projection is withdrawn from the aperture and the device can be withdrawn. A second aperture 39 can also be provided so that the device can be reversed.

In the operation of this device, the structure is maneuvered into a compressed position so that the latch lever 27 is substantially nested in the frame 21 and the spring 34 (or 35) is compressed. In this position of the parts, the rope hook can bodily be thrust through the opening 13 until the top plate 24 abuts the top wall of the body. When the latch member 27 is then manually released, the spring 34 (or 35) is effective to pivot the latch lever 28 until the lever end 29 lies under the flange 14. In this position of the parts, the rope hook cannot be withdrawn from the body, but actually is firmly gripped therein. There is thus afforded an exposed hook 32 to receive a rope 36 to hold lading in the body. The normal direction of pull of the rope 36 on the hook 32 is such as to urge the latch member firmly into its latched position so that the more load that is imposed by the rope 36, the more firmly the rope hook is held.

After the lading has been released and the rope 36 has been disengaged from the hook 32, the user can engage the hook 32 with his finger, pulling the hook into its other position nesting against the frame 21. Following that, by an upward movement of the hook 32, the entire mechanism can be withdrawn through the opening 13, which is then usable by the regular stake.

What is claimed is:

1. A rope hook for use with a pickup body having a stake opening therein comprising an elongated frame adapted to enter said opening, a pad on one end of said frame adapted to abut said body on the side of said opening, a latch lever adapted to enter said opening, means for pivoting said latch lever on said frame for movement between a first position with one end of said latch lever underlying said body adjacent said opening and a second position with said end of said latch lever lying in said opening, a hook adapted to be engaged by a rope and mounted on and extending from said one end of said lever beyond said pad, and a spring interposed between said frame and said latch lever and urging said latch lever into said first position.

2. A rope hook for use with a body having a wall forming a flange bordering a stake opening, a frame adapted to extend through said opening, a stop on said frame adapted to abut said wall outside said opening, a latch lever, means for pivoting said latch lever on said frame for movement between a first position with one end of said lever underlying said flange and a second position with said one end of said lever in line with said opening, a hook on said lever adapted to be engaged by a rope and extending through said opening beyond said stop, and means for urging said lever into said first position.

3. A rope hook for use with a body having a wall forming a flange bordering a stake opening, a frame adapted to extend through said opening, a stop on said frame adapted to abut said wall outside said opening, a latch member adapted to extend through said opening and terminating in a hook adapted to be engaged by a rope, means on said latch member forming a latch, means for mounting said latch member on said frame for movement between a first position in which said latch underlies said flange and said hook overlies said flange and a second position in which said latch is in line with said opening, and means for urging said latch member into said first position.

4. A rope hook as in claim 3 in which said hook is disposed on said latch member in a position so that the normal pull of a rope on said hook urges said latch member toward said first position.

5. A rope hook for use with a body having a wall forming a flange bordering a stake opening comprising a device having a first portion adapted to extend through said opening and having a second portion adapted to extend through said opening, stop means on said device and adapted to abut the outside of said flange to stop movement of said device through said opening in one direction, latch means on said device and adapted in a first position to abut the inside of said flange to stop movement of said device through said opening in the other direction and in a second position to clear the inside of said flange to permit movement of said device through said opening in said other direction, means for urging said latch means toward said first position, and a hook adapted to receive a rope, said hook being disposed on said device and located on the outside of said flange and positioned to receive a rope force in one direction urging said latch means toward said first position and to receive a rope force in another direction urging said latch means toward said second position.

References Cited by the Examiner

UNITED STATES PATENTS

| | | | |
|---|---|---|---|
| 940,213 | 11/1909 | Stubblefield | 24—230 |
| 2,638,375 | 5/1953 | Jewell | 296—43 |
| 3,102,708 | 9/1963 | Crain | 248—361 |

FOREIGN PATENTS

| | | |
|---|---|---|
| 656,170 | 12/1928 | France. |

CLAUDE A. LE ROY, *Primary Examiner.*

J. F. FOSS, *Assistant Examiner.*